United States Patent
Shichino

(10) Patent No.: US 9,584,469 B2
(45) Date of Patent: Feb. 28, 2017

(54) INFORMATION PROCESSING APPARATUS, INFORMATION PROCESSING SYSTEM, AND COMPUTER-READABLE RECORDING MEDIUM HAVING STORED PROGRAM

(71) Applicant: FUJITSU LIMITED, Kawasaki-shi, Kanagawa (JP)

(72) Inventor: Nobuyuki Shichino, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 14/477,916

(22) Filed: Sep. 5, 2014

(65) Prior Publication Data

US 2015/0092600 A1   Apr. 2, 2015

(30) Foreign Application Priority Data

Sep. 30, 2013   (JP) ................. 2013-204656

(51) Int. Cl.
*H04L 12/28* (2006.01)
*H04L 29/12* (2006.01)
*G06F 13/38* (2006.01)

(52) U.S. Cl.
CPC ........ *H04L 61/2046* (2013.01); *G06F 13/385* (2013.01); *H04L 61/2514* (2013.01);
(Continued)

(58) Field of Classification Search
CPC .... G06F 9/4411; G06F 15/177; G06F 15/173; H04L 67/1097; H04L 29/08;
(Continued)

(56) References Cited

U.S. PATENT DOCUMENTS 7,802,000 B1 * 9/2010 Huang ................. G06F 9/5077 455/404.2
8,194,674 B1 * 6/2012 Pagel ................. H04L 12/4641 370/393

(Continued)

FOREIGN PATENT DOCUMENTS

JP   2009-151744   7/2009
JP   2010-49676    3/2010

OTHER PUBLICATIONS

Extended European Search Report dated Apr. 15, 2015 for corresponding European Patent Application No. 14181378.2, 6 pages.

*Primary Examiner* — Hanh N Nguyen
(74) *Attorney, Agent, or Firm* — Fujitsu Patent Center

(57) ABSTRACT

An information processing apparatus is connectable to an external network, and includes a plurality of units, an external network interface, and an internal network interface. The external network interface is provided in at least one of the plurality of units, and connected to the external network. The internal network interface is provided in each of the plurality of units, and is connected to an internal network which is established by a second address system independent from a first address system of the external network connected to the external network interface. Then, the internal network interface of each of the plurality of units conducts communication between the plurality of units using the second address system. Therefore, the internal network having no influence on the external network can be established.

15 Claims, 13 Drawing Sheets

(52) U.S. Cl.
CPC .. *H04L 61/2525* (2013.01); *G06F 2213/3808* (2013.01); *H04L 61/2007* (2013.01); *H04L 61/2038* (2013.01)

(58) Field of Classification Search
CPC . H04L 12/24; H04L 41/0806; H04L 41/5025; H04L 12/28; H04L 12/26
USPC ....... 709/228, 220, 226, 238, 223, 227, 225; 370/400, 401, 241–245, 389–396, 395.21
See application file for complete search history.

(56) References Cited

U.S. PATENT DOCUMENTS

| | | | |
|---|---|---|---|
| 8,335,840 B2* | 12/2012 | Shichino | H04L 29/12254 709/220 |
| 8,913,507 B2* | 12/2014 | Veteikis | H04L 49/555 370/241 |
| 9,094,302 B2* | 7/2015 | Nguyen | H04L 41/0806 |
| 2009/0138567 A1 | 5/2009 | Hoover et al. | |
| 2010/0050189 A1 | 2/2010 | Sng | |
| 2010/0251335 A1 | 9/2010 | Srisuresh et al. | |

\* cited by examiner

INFORMATION PROCESSING APPARATUS, INFORMATION PROCESSING SYSTEM, AND COMPUTER-READABLE RECORDING MEDIUM HAVING STORED PROGRAM

CROSS-REFERENCE TO RELATED APPLICATIONS

This application is based upon and claims the benefit of priority of the prior Japanese Application No. 2013-204656 filed on Sep. 30, 2013 in Japan, the entire contents of which are hereby incorporated by reference.

FIELD

The embodiments discussed herein are directed to an information processing apparatus, an information processing system, and a computer-readable recording medium having stored a program.

BACKGROUND

In general, an information processing apparatus which includes a server apparatus and a storage apparatus is improved in maintenance and availability (verbosity) by dividing various internal functions into a plurality of units.

When Ethernet (registered trademark) is introduced between the plurality of units for the cooperation between the plurality of units which are divided as described above, the information processing apparatus can use various application software which utilizes Ethernet. Therefore, it is possible to improve productivity of the information processing apparatus.

However, in a case where Ethernet is introduced as an internal network, it is advisable that the address system of Ethernet is established without contradiction (conflict) to the address system of an external network which is linked to the information processing apparatus. For this reason, a process of changing the address system of the internal network in cooperation with the address setting and address change of the external network is implemented. In this way, during a period while the process of changing the address system of the internal network, it is difficult to keeping the cooperation between the units.

Herein, an example of a conflict between the address system of the internal network and the address system of the external network will be described with reference to FIG. 13.

In the example illustrated in FIG. 13, a terminal 400 is communicably connected to an information processing apparatus 100 through an external network 200 and a gateway 300. Further, the information processing apparatus 100, for example, includes five units 101 to 105. These units 101 to 105 are communicably connected through an internal network 106.

Herein, the external network 200 is Ethernet which is managed by a user who uses the information processing apparatus 100. The information processing apparatus 100 is an interface which provides an Ethernet service.

Further, the internal network 106 of the information processing apparatus 100 is Ethernet which connects the units 101 to 105 in the information processing apparatus 100. The units 101 to 105 cooperate to each other through the internal network 106.

The respective units 101 to 105 are components included in the information processing apparatus 100, and divided according to certain functions in order to improve maintenance and availability (verbosity) of the information processing apparatus 100. In each of the units 101 to 105, a general-purpose OS is loaded to use Ethernet applications. Then, the unit 101 includes an external network interface 110 which is connected to the external network 200 and conducts communication with the external terminal 400. Further, the unit 101 includes an internal network interface 111 which is connected to the internal network 106 and conducts communication with the other units 102 to 105. Similarly, the units 102 to 105 include internal network interfaces 121 to 151, respectively, which are connected to the internal network 106 and conduct communication with the unit 101. In addition, the units 101 to 105 may be denoted by Units #1 to #5, respectively.

At this time, the Internet Protocol (IP) address 192.168.1.1 for the external network 200 is assigned to the information processing apparatus 100 (the external network interface 110). Further, the IP address 172.16.0.10 is assigned to the terminal 400. Then, the IP addresses 172.16.0.1 to 172.16.0.5 for the internal network 106 are assigned to the units 101 to 105 (the internal network interfaces 111 to 151) in the information processing apparatus 100, respectively.

In a case where the IP addresses are assigned as described above, the unit 101 loses its ability to conduct communication with the external terminal 400. This is because the IP address of the terminal 400 is 172.16.0.10 and belongs to the address system of the internal network 106 of the information processing apparatus 100. In this case, even when the unit 101 tries to conduct communication with the terminal 400, a packet addressed to the terminal 400 flows into the internal network 106.

Therefore, as illustrated in FIG. 13, in a case where the address used in the outside of the information processing apparatus 100 comes into conflict with the address system used in the information processing apparatus 100, the process of changing the address system of the internal network, as described above, is performed in cooperation with the address of the external network.

As described above, when the process of changing the address system of the internal network in cooperation with the address of the external network is occurred, there is a problem in that it is difficult to keep the cooperation between the units during a period when the process is performed.

Patent Document 1: Japanese Laid-open Patent Publication No. 2010-49676
Patent Document 2: Japanese Laid-open Patent Publication No. 2009-151744

SUMMARY

An information processing apparatus according to the present application is connectable to an external network, and includes a plurality of units, an external network interface, and an internal network interface. The external network interface is provided in at least one of the plurality of units, and connected to the external network. The internal network interface is provided in each of the plurality of units, and is connected to an internal network which is established by a second address system independent from a first address system of the external network connected to the external network interface. Then, the internal network interface each of the plurality of units conducts communication between the plurality of units using the second address system.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF THE PREFERRED EMBODIMENTS

Figure 1:
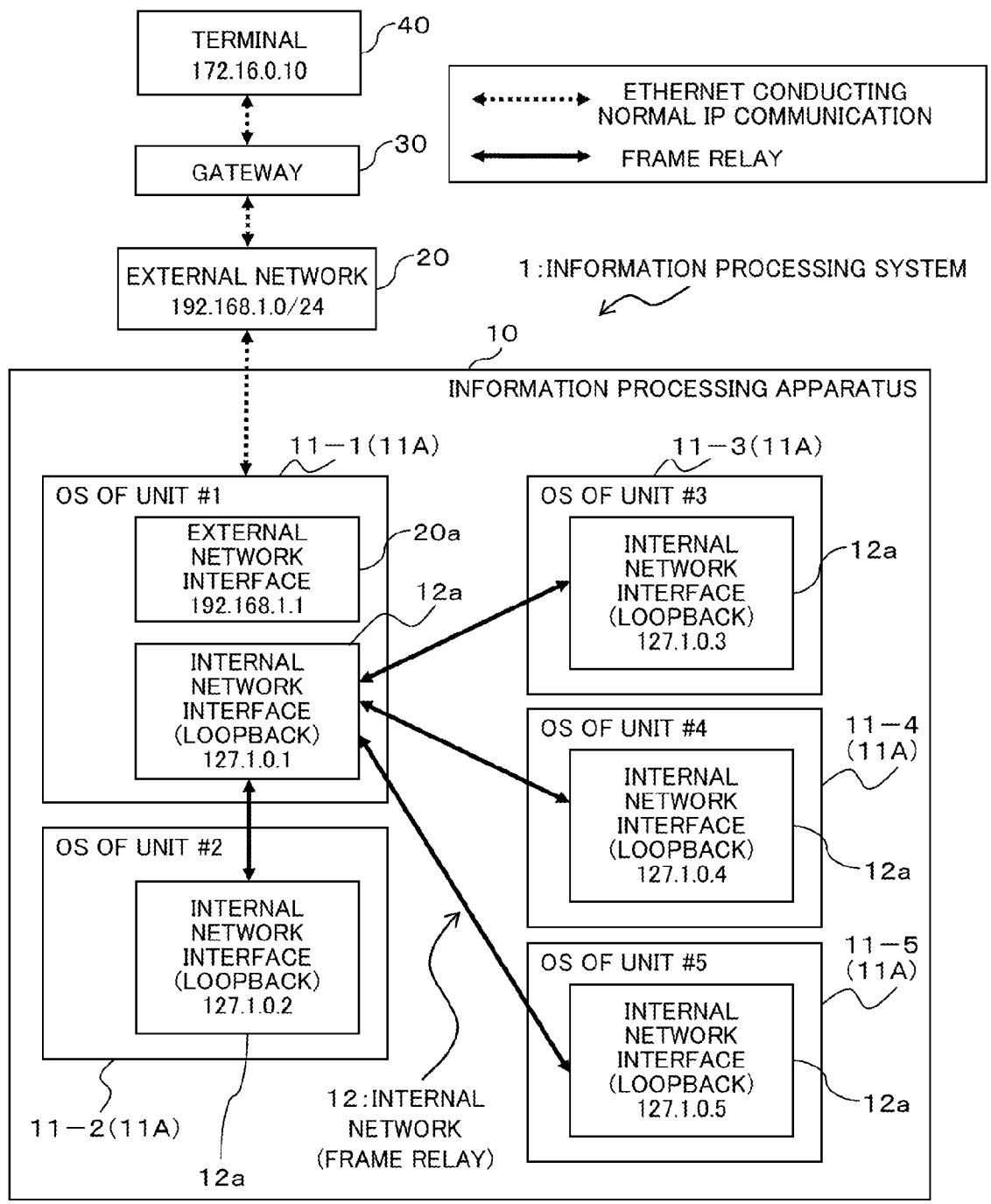
FIG. 1 is a block diagram illustrating a hardware configuration and a functional configuration of an information processing system which includes an information processing apparatus according to the embodiment.

Hereinafter, embodiments of an information processing apparatus, an information processing system, and a program disclosed in the present application will be described in detail with reference to the drawings. However, the following embodiments are given as merely exemplary, and it is not intended to exclude various modifications and various technical applications which are not specified in the embodiments. In other words, the embodiments can be implemented in various forms within a scope not departing from the spirit thereof. Further, there is no purpose of exclusively including only the components in the drawings, but other functions can be included. Then, the respective embodiments can be implemented by appropriately combining each other in a scope where the processing contents are not contradicted.

[1] Configurations of Information Processing System Having Information Processing Apparatus of Embodiment First, a hardware configuration and a functional configuration of an information processing system 1 which includes an information processing apparatus 10 according to the embodiment will be described with reference to FIG. 1. In addition, FIG. 1 is a block diagram illustrating the hardware configuration and the functional configuration.

In the information processing system 1 illustrated in FIG. 1, a terminal (external unit) 40 is communicably connected to the information processing apparatus 10 through an external network 20 and a gateway 30. Further, the information processing apparatus 10, for example, includes five units 11-1 to 11-5, and these units 11-1 to 11-5 are communicably connected to one another through an internal network 12. In addition, as a symbol for indicating a unit, when there is a need to specify one of a plurality of units, the symbols 11-1 to 11-5 will be used, and when any unit is indicated, the symbol 11 will be used. Further, the information processing apparatus 10, for example, is assumed to include a server apparatus, a unified storage device, and the like.

The information processing apparatus 10 of the embodiment is connectable to the external network 20, and as to be described below includes at least the plurality of units 11, an external network interface 20a, and an internal network interface 12a. The external network interface 20a is provided in at least one unit 11-1 of the plurality of units 11, and is connected to the external network 20. Further, the internal network interface 12a is provided in each unit 11, and connected to the internal network 12 which is established by a second address system independent from a first address system of the external network 20 connected to the external network interface 20a. Then, the internal network interface 12a of each unit 11 conducts communication between the plurality of units 11 using the second address system.

Herein, the external network 20 is Ethernet which is managed by a user who uses the information processing apparatus 10. The information processing apparatus 10 is an interface which provides an Ethernet service.

Further, the internal network 12 of the information processing apparatus 10 is a frame relay network which connects the units 11 in the information processing apparatus 10. The units 11 cooperate with each other through the internal network 12.

The respective units 11 are components included in the information processing apparatus 10, and various functions are divided and assigned to the units in the information processing apparatus 10. Therefore, maintenance and availability (verbosity) are improved by dividing such functions and assigning them to the plurality of units 11. On each unit 11, a general-purpose OS 11A is loaded in order to use an Ethernet application. Further, each unit 11 includes a loopback device 14 (see FIG. 2) which conducts communication between processes (applications) in the OS 11A.

The unit 11-1 which is one of the plurality of units 11 includes the external network interface 20a which is connected to the external network 200 and conducts communication with the terminal (external Step) 40. Further, the unit 11-1 includes the internal network interface 12a which is connected to the internal network 12 and conducts communication with the other units 11-2 to 11-5. Similarly, each of the units 11-2 to 11-5 includes the internal network interface 12a which is connected to the internal network 12 and conducts communication with the unit 11. In addition, the units 11-1 to 11-5 may be denoted as Units #1 to #5, respectively.

At this time, in the information processing system 1 according to the embodiment, the second address system independent from the first address system (192.168.1.0/24) of the external network 20 is established in the internal network 12. Therefore, in the embodiment, the address system of inter-process communication conducted by the loopback device 14 is used as the second address system.

Figure 3:
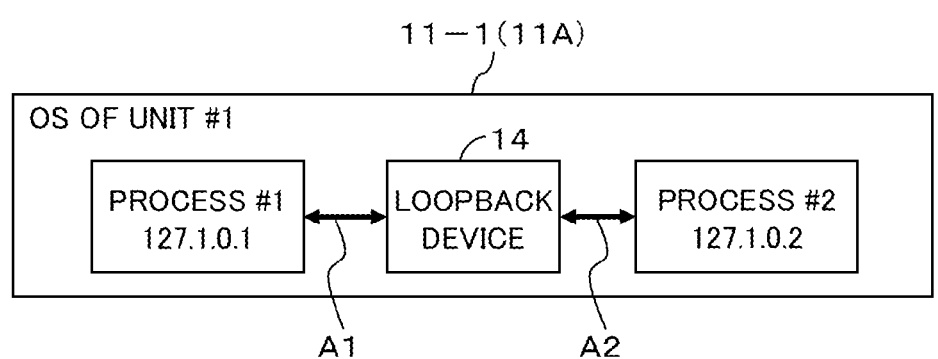
FIGS. 3 and 4 are diagrams for describing inter-process communication of a loopback device.
Figure 4:
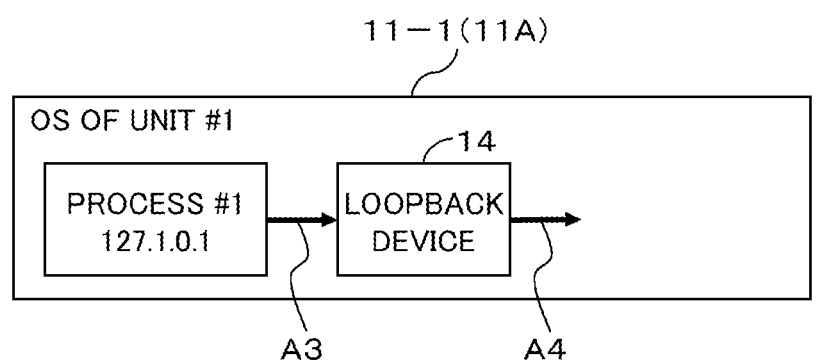

A packet flowing to the loopback device 14 does not flow out of the OS 11A which uses the packet due to the characteristics of the loopback device 14. For example, as illustrated in FIG. 3, the packet is used for the cooperation between two Processes #1 and #2 in one OS 11A (see arrows A1 and A2 of FIG. 3). FIG. 3 illustrates an example of conducting inter-process communication on the unit 11-1, and Processes #1 and #2 are assigned with addresses 127.1.0.1 and 127.1.0.2, respectively. Further, as illustrated in FIG. 4, the packet addressed to the loopback device 14 can be transmitted even when there is no transmission destination (see arrows A3 and A4 of FIG. 4). In other words, it is possible to transmit the packet without causing an error even when there is no transmission destination. In this case, the packet having no transmission destination will be discarded after being transmitted to the loopback device 14. In addition, FIGS. 3 and 4 are diagrams for describing the inter-process communication conducted by the loopback device 14.

The address system in the inter-process communication conducted by the loopback device 14 is 127.0.0.0/8, and it is possible to secure about 16.77 million addresses. In the embodiment, IP addresses on the loopback device 14 are assigned not to cause conflicts in the units 11-1 to 11-5 which are included in the information processing apparatus 10. For example, in FIG. 1, addresses 127.1.0.1 to 127.1.0.5 of the address system for looping back are assigned to the units 11-1 to 11-5 as the IP addresses.

Therefore, the internal network interface 12a is established by the second address system independent from the first address system of the external network 20, and conducts communication between the units 11 using the address system in the inter-process communication conducted by the loopback device 14. In this case, as described above, the packet flowing to the loopback device 14 does not flow out of the OS 11A which uses the packet due to the characteristics of the loopback device 14. In the embodiment, as to be described below with reference to FIGS. 5 to 12, an IP network using the loopback device 14 is established by using the functional configuration of each unit 11 which will be described with reference to FIG. 2.

In addition, the second address system (IP addresses of the respective units 11) may be manually set to each unit 11 by a system manager, or may be configured to be automatically set by software such as an OS. For example, the firmware of each unit 11 automatically generates and sets its own address based on location information (slot number) of the hardware. Further, as another example, a dynamic host configuration protocol (DHCP) function is included in the OS 11A of Unit #1 or a control unit such as a CPU 11a to automatically deliver setting information to the other units 11, so that each unit 11 may receive the setting information for its own setting. According to the DHCP function, the connection can be immediately performed using appropriate setting even though the network setting is not made manually. Therefore, a user who does not have enough knowledge of the network setting can simply make connection.

As the internal network 12 for communicably connecting the units 11, for example, a general-purpose communication line which is not for the IP communication is used. Further, as the general-purpose communication line, for example, a frame relay communication line (such as a serial line and Ethernet using no IP) can be used. In the example illustrated in FIG. 1, the frame relay communication line is used as the internal network 12. Therefore, the internal network interface 12a of each unit 11 has functions as a frame relay transmission unit and a frame relay reception unit. With the use of relays and the like in the unit 11, it is possible to establish a network environment which enables frame relaying between arbitrary units 11.

In addition, a shared memory (not illustrated) may be provided as the internal network 12 between the plurality of units 11 instead of the general-purpose communication line. Therefore, the communication may be conducted between the units 11 through the shared memory.

Further, in the information processing system 1 illustrated in FIG. 1, the IP address 192.168.1.1 for the external network 20 is assigned to the information processing apparatus 10 (the external network interface 20a), and the IP address 172.16.0.10 is assigned to the terminal 40.

Furthermore, the plurality of units 11 serving as various divided functions of the information processing apparatus 10 may be physically independent from each other, and communicably connected to each other through the internal network 12. Further, some of the plurality of units 11 serving as various divided functions of the information processing apparatus 10 may be a plurality of virtual machines (not illustrated) which are established on a hypervisor (virtualized OS; not illustrated) executed by the CPU 11a of each unit 11 (see FIG. 2). Different types of OSs 11A are operated in parallel on the plurality of virtual machines (the units 11).

As an example of making the plurality of OSs 11A operate on the hypervisor in one CPU 11a, there is a unified storage device. In the unified storage device, for example, a storage area network (SAN) OS and a network attached storage (NAS) OS are operated on the hypervisor. As the SAN OS, for example, VxWorks (registered trademark) made by Wind River is used, and as the NAS OS, for example, Linux (registered trademark) is used.

In such a unified storage device, the unit (virtual machine) 11 which operates the SAN OS can conduct communication using the internal network interface 12a with other units 11 outside the CPU 11a through the internal network 12. Although the unit (virtual machine) 11 which operates the NAS OS can conduct communication with the unit 11 which is mounted on the same hypervisor as the NAS OS and operates the SAN OS, it is generally not allowed to conduct communication with other units 11 which are outside the CPU 11a and not directly connected to the NAS OS.

[2] Configurations of Each Unit in Information Processing Apparatus of Embodiment Next, a hardware configuration and a functional configuration of each unit 11 included in the information processing apparatus 10 illustrated in FIG. 1 will be described with reference to FIG. 2. In addition, FIG. 2 is a block diagram illustrating the hardware configuration and the functional configuration.

Each unit 11 includes at least the CPU (processing unit) 11a and the memory (storage unit) 11b. In addition, in a case where the unit 11 is a virtual machine, the CPU 11a and the memory 11b are shared by the plurality of virtual machines (the units 11) on the same hypervisor. The memory 11b, for example, is a random access memory (RAM), a read only memory (ROM), a hard disk drive (HDD), a solid state drive (SSD), or the like. The memory 11b stores various types of information necessary for the processes in the units 11, for example, software relating to the OS 11A, the hypervisor, and the like described above, and an application program for realizing various functions (see symbols 12a, 14 to 18, and 20a).

Figure 2:
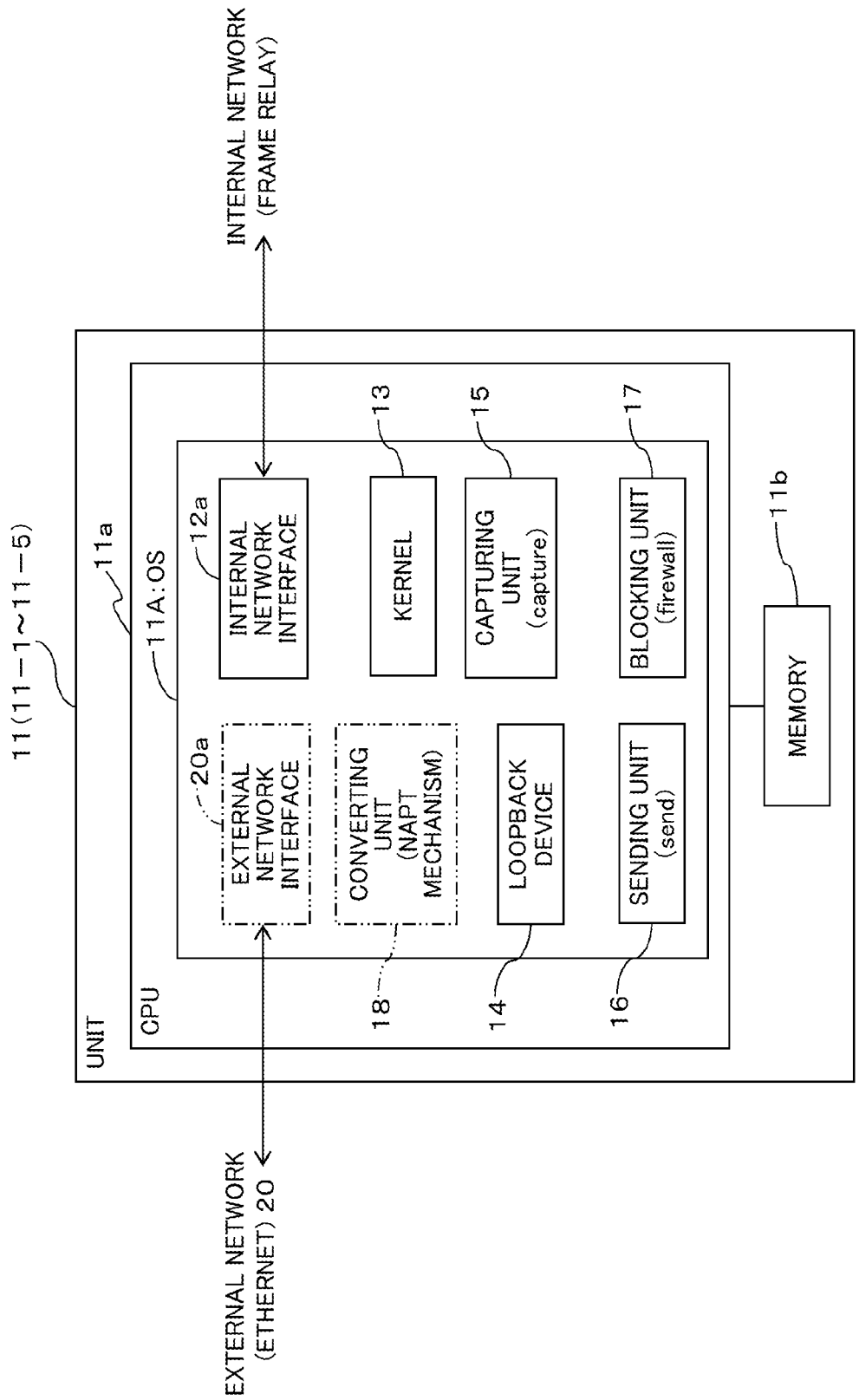
FIG. 2 is a block diagram illustrating a hardware configuration and a functional configuration of each unit which is included in the information processing apparatus illustrated in FIG. 1.

As illustrated in FIG. 2, the CPU 11a of the unit 11-1 which is connected to the external network 20 functions as the internal network interface 12a, a capturing unit 15, a sending unit 16, a blocking unit 17, a converting unit 18, and the external network interface 20a by executing the application program stored in the memory 11b. Further, the CPUs 11a of the units 11-2 to 11-5 which are connected to the unit 11-1 through the internal network 12 function as the internal network interface 12a, the capturing unit 15, the sending unit 16, and the blocking unit 17 by executing the application program stored in the memory 11b.

As described above with reference to FIG. 1, the external network interface 20a in the unit 11-1 is connected to the external network 20 by the first address system (192.168.1.0/24) of the external network (Ethernet) 20, and conducts communication with the terminal 40.

As described above with reference to FIG. 1, the internal network interface 12a in each unit 11 conducts communication between the units 11 by the address system (127.1.0.1/5) of the inter-process communication conducted by the loopback device 14.

Further, the internal network interface 12a has a function of selecting a packet addressed to its own unit, transferring the packet to the sending unit 16 (to be described below), and transferring other packets except the packet addressed to its own unit to the other units. The function, for example, is effectively used in a case where the plurality of units 11 of each unified storage device described above are a plurality of virtual machines established on the hypervisor. In other words, in a case where a packet addressed to the unit 11 which operates the NAS OS is received by the unit 11 which operates the SAN OS, the packet is transferred according to the function from the unit 11 which operates the SAN OS to the unit 11 which operates the NAS OS through the hypervisor.

In the OS 11A, the capturing unit 15 captures a packet P1 (see FIGS. 6 to 10) which is generated by a process at a transmission source (see Process #1 in FIGS. 6 to 10) and passes through the loopback device 14. The function as the capturing unit 15 can be realized using a capture function which is originally provided in the OS 11A. The capture function is to capture a packet in order to monitor a network state, and the capturing unit 15 captures the packet P1, which passes through the loopback device 14, using the capture function. The internal network interface 12a outputs the packet P1 captured by the capturing unit 15 to the internal network 12, and transmits the packet to the unit 11 at the transmission destination according to the address system in the inter-process communication conducted by the loopback device 14.

Further, the capturing unit 15 captures a response packet P2 (see FIGS. 11 and 12), which is generated by a process at the transmission destination (see Process #2 in FIGS. 8, 11, and 12) and passes through the loopback device 14, to a process at the transmission source of the other unit 11 (see Process #1 above). The capturing unit 15 captures the response packet P2 which passes through the loopback device 14 using the above capture function. The internal network interface 12a outputs the response packet P2 captured by the capturing unit 15 to the internal network 12, and transmits the packet to the other unit 11 at the transmission source according to the address system in the inter-process communication conducted by the loopback device 14.

When the internal network interface 12a receives the packet addressed to its own unit from the other unit according to the address system in the inter-process communication conducted by the loopback device 14, the sending unit 16 starts up. When starting up, the sending unit 16 sends the packet (P1 or P2) addressed to its own unit received by the internal network interface 12a to the process (Process #2 or #1) at the transmission destination through the loopback device 14. The function as the sending unit 16 can be realized using a send function which is originally provided in the OS 11A.

The blocking unit (firewall) 17 blocks the packet P1, which passes through the loopback device 14, between the loopback device 14 and a kernel 13 of the OS 11A. Further, the blocking unit 17 blocks the response packet P2, which passes through the loopback device 14, between the loopback device 14 and the kernel 13 of the OS 11A. In addition, the blocking function of the blocking unit 17 will be described below with reference to FIGS. 9 to 12. The kernel 13 is software which provides basic functions as the OS such as monitoring application software and peripheral devices, managing resources such as disks and memories, an interrupt process, and the inter-process communication.

In the unit 11-1 connected to the external network 20, the converting unit 18 performs address conversion between the first address system of the external network 20 and the second address system of the internal network 12. The function as the converting unit 18 can be realized using a network address port translation (NAPT) mechanism. By the converting unit 18, each unit 11 in the information processing apparatus 10 becomes possible to conduct communication with an external mechanism (for example, the terminal 40) which is connected to the external network 20.

[3] Operations of Each Unit in Information Processing Apparatus of Embodiment

Figure 5:
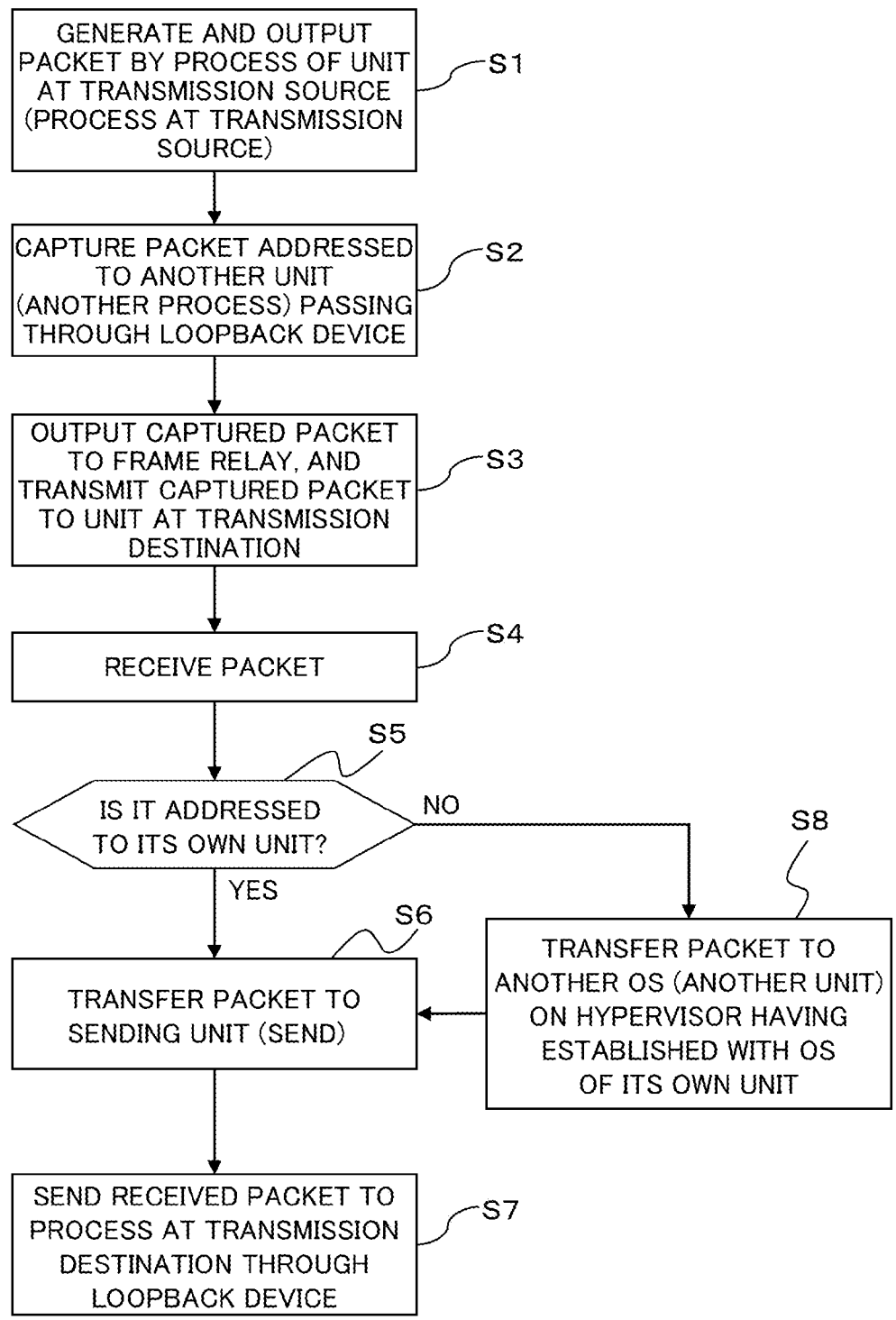
FIG. 5 is a flowchart for describing a basic communication procedure between the units in the embodiment.

Next, the operations of the information processing system 1 which includes the information processing apparatus 10 according to the embodiment as configured above, and in particular the operations of each unit 11 will be described with reference to FIGS. 5 to 12. FIG. 5 is a flowchart for describing a basic communication procedure between the units in the embodiment, and FIGS. 6 to 12 are diagrams for describing the communication operation between the units according to the embodiment. In FIGS. 6 to 12, the communication operation between the unit 11-1 and the unit 11-2 is described in which only the main components in the unit 11 are illustrated. As described above, the IP addresses 127.1.0.1 and 127.1.0.2 of the address system in the inter-process communication conducted by the loopback device 14 are assigned to the units 11-1 and 11-2, respectively. In addition, in the drawings, the same symbols as those described above indicate the identical or similar portions, and thus the descriptions thereof will not be repeated.

First, the basic communication procedure between the units will be described according to a flowchart (Steps S1 to S8) illustrated in FIG. 5 with reference to FIGS. 6 to 8.

Figure 6:
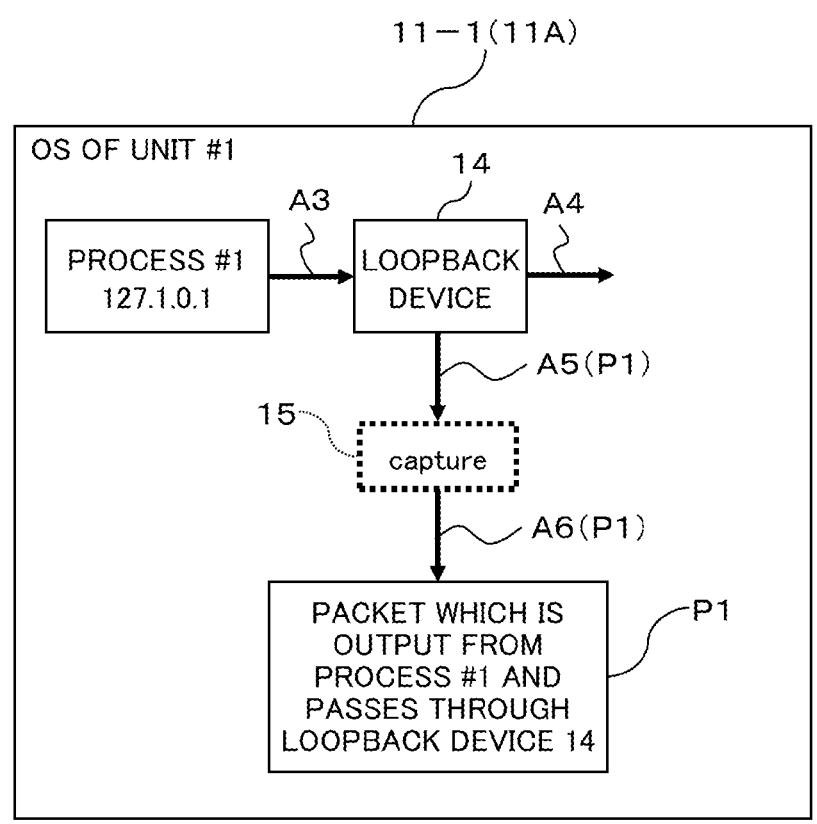
FIGS. 6 to 12 are diagrams for describing communication operations between the units in the embodiment.
Figure 7:
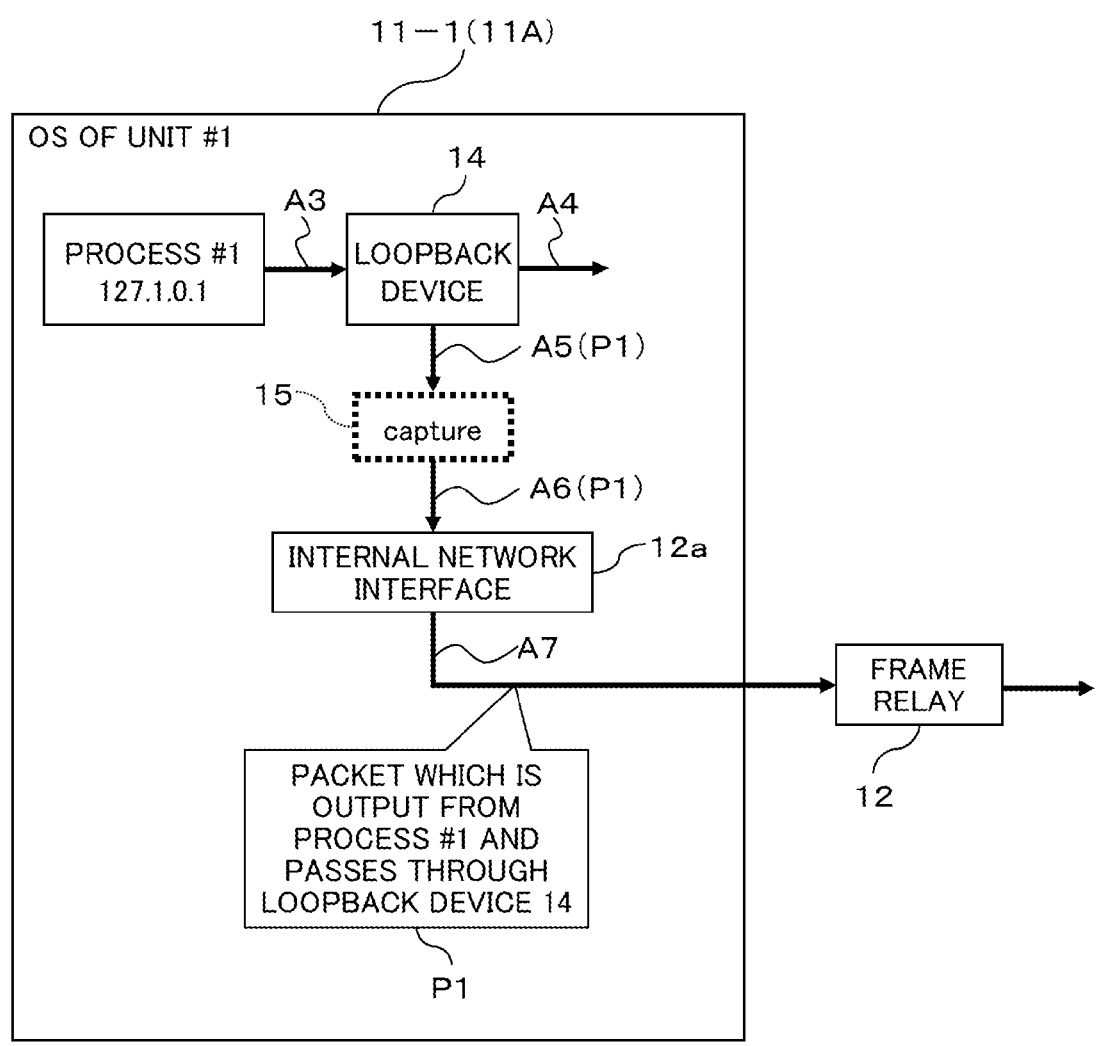

In a case where the communication is conducted between the unit 11-1 and the unit 11-2, Process (Process at the transmission source) #1 of the unit 11-1 at the transmission source generates a packet to Process (Process at the transmission destination) #2 of the unit 11-2 at the transmission destination and outputs the packet to the loopback device 14 (Step S1; see arrows A3 and A4 of FIG. 6).

At this time, the capturing unit (capture) 15 puts a packet capture on the loopback device 14, and extracts the packet P1 addressed to Process #2 at the transmission destination (Step S2; see arrows A5 and A6 of FIG. 6). Then, the packet P1 extracted by the capturing unit 15 is output to an appropriate frame relay 12 according to the IP address of Process #2 at the transmission destination using a function as the frame relay transmission unit of the internal network interface 12a (see arrow A7 of FIGS. 7 and 8). Therefore, the packet P1 is transmitted to the unit 11-2 at the transmission destination (Step S3).

Figure 8:
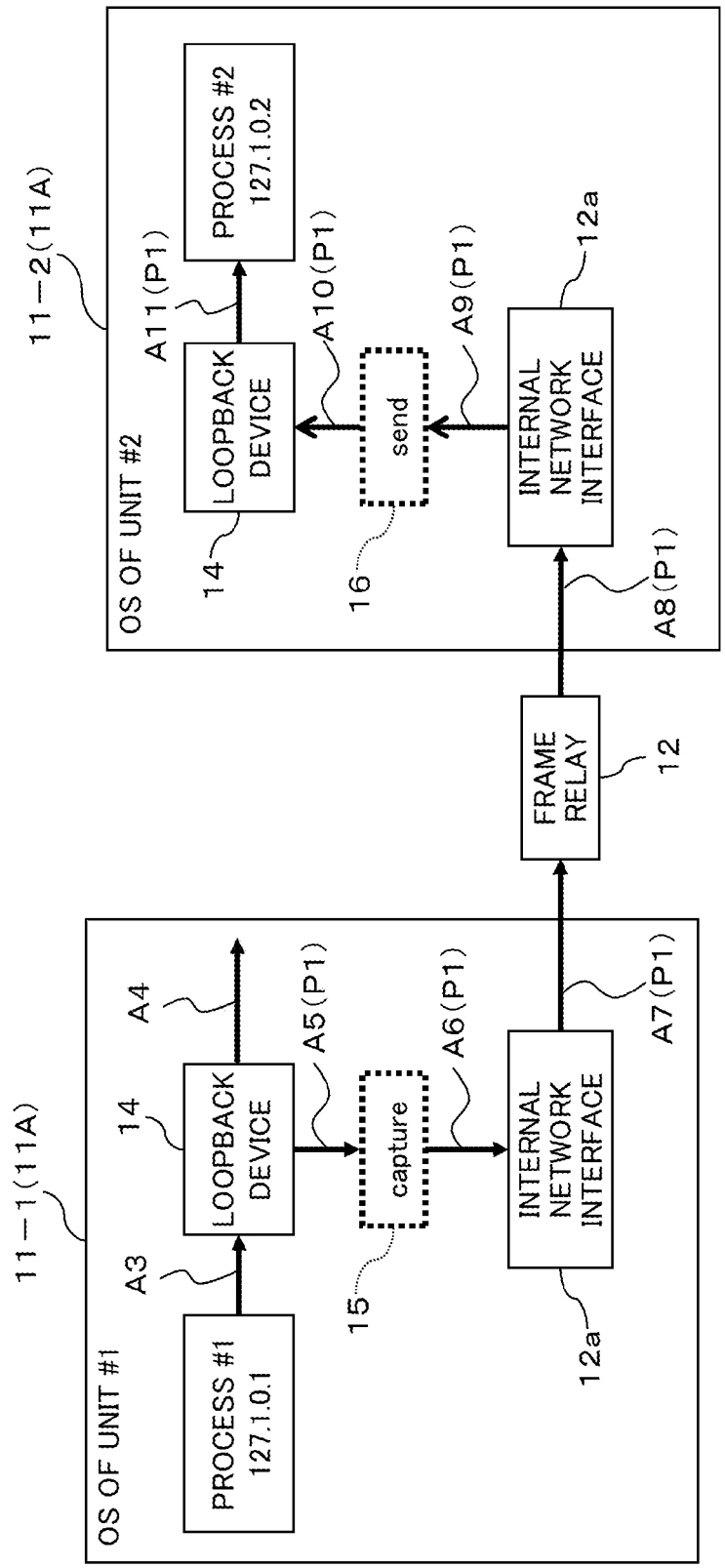

The packet P1 transmitted by the frame relay 12 is received using a function as the frame relay reception unit of the internal network interface 12a of the unit 11-2 at the transmission destination (Step S4; see arrow A8 of FIG. 8). The internal network interface 12a which has received the packet P1 determines whether the packet P1 is addressed to its own unit 11-2 (Step S5).

In a case where the received packet P1 is addressed to its own unit 11-2 (YES route of Step S5), the internal network interface 12a transfers the packet P1 to the sending unit (send) 16 (Step S6; see arrow A9 of FIG. 8). Then, the sending unit (send) 16 sends the packet P1 to Process #2 at the transmission destination through the loopback device 14 (Step S7; see arrows A10 and A11 of FIG. 8).

In a case where the packet P1 is not addressed to its own unit 11-2 (NO route of Step S5), the internal network interface 12a transfers the packet P1 to another OS 11A (another unit 11) on the hypervisor on which the OS 11A of its own unit 11-2 is established (Step S8). Thereafter, the same processes as Steps S6 and S7 are performed in the other units 11 at the transfer destination.

In addition, also the packet transmission from the unit 11-2 (Process #2) to the unit 11-1 (Process #1) is performed according to the same procedure as described above. Therefore, the communication is realized between the unit 11-1 and the unit 11-2.

Figure 9:
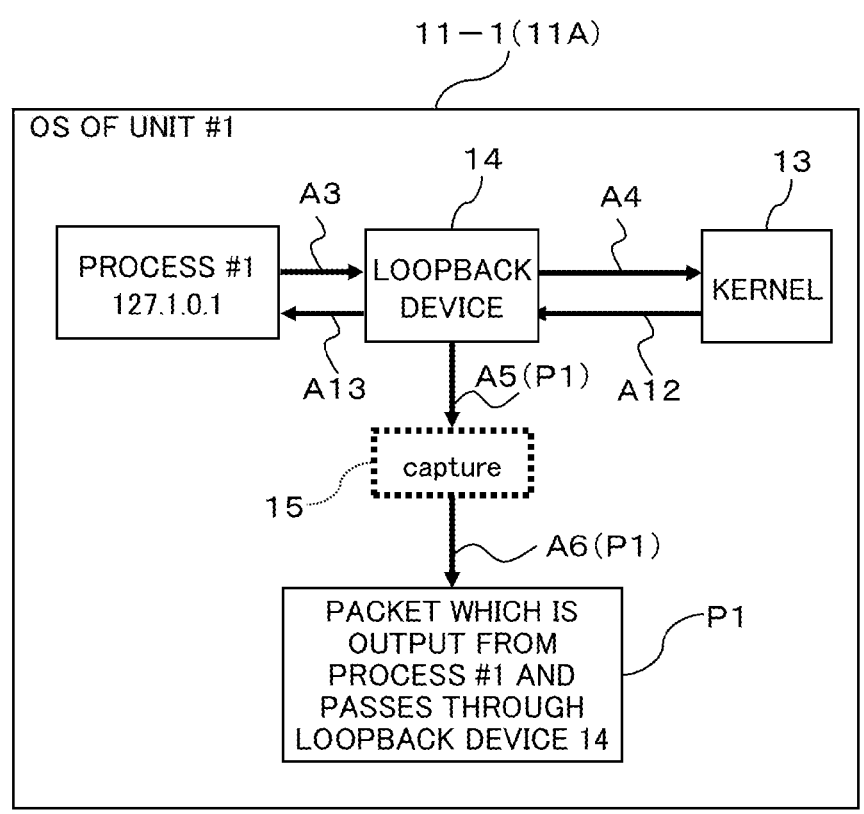
Figure 11:
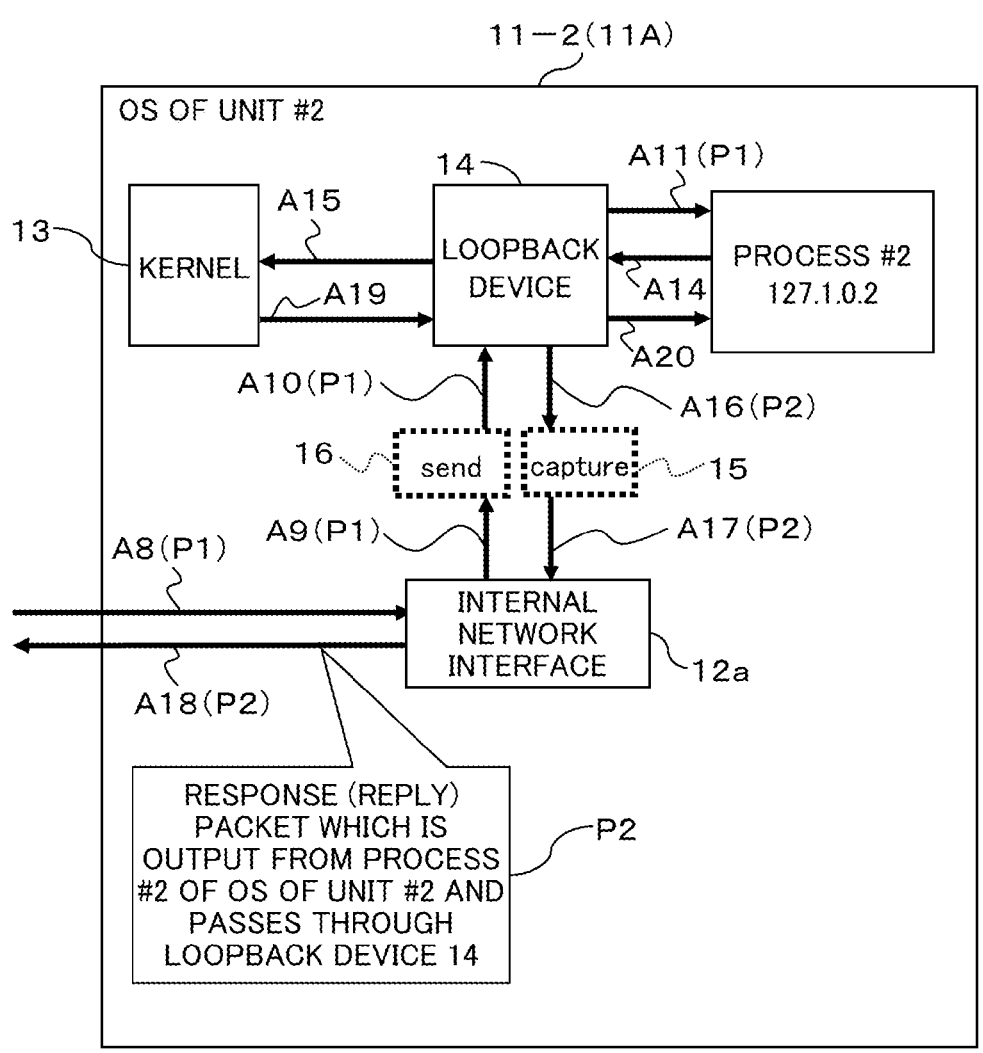

Hitherto, the description has been made about the basic communication procedure between the units in the embodiment. However, in a case where transmission control protocol (TCP) communication is conducted, the communication between the units may not be allowed depending on types of OSs as illustrated in FIGS. 9 and 11. For example, in FIG. 4, the packet transmitted from Process #1 is illustrated to disappear after passing through the loopback device 14. However, depending on the types of OSs (for example, Linux), the packet which has passed through the loopback device 14 may be received by the kernel 13 (see arrow A4 of FIG. 9). When receiving such a packet, the kernel 13 considers the communication by the packet as the TCP communication for a non-existent service (Process #2), and replies to Process #1 at the transmission source with a communication end signal, that is, a TCP reset signal (RST) (see arrows A12 and A13 of FIG. 9). By the reset signal, the connection of the TCP communication is cut off, and the communication relating to the packet P1 from Process #1 at the transmission source is stopped. Therefore, as illustrated in FIGS. 6 to 8, even when there is a reply to the captured packet P1 from the unit 11-2 at the transmission destination, it is not possible to handle the reply, and thus the communication between the units is ended without being established.

Figure 10:
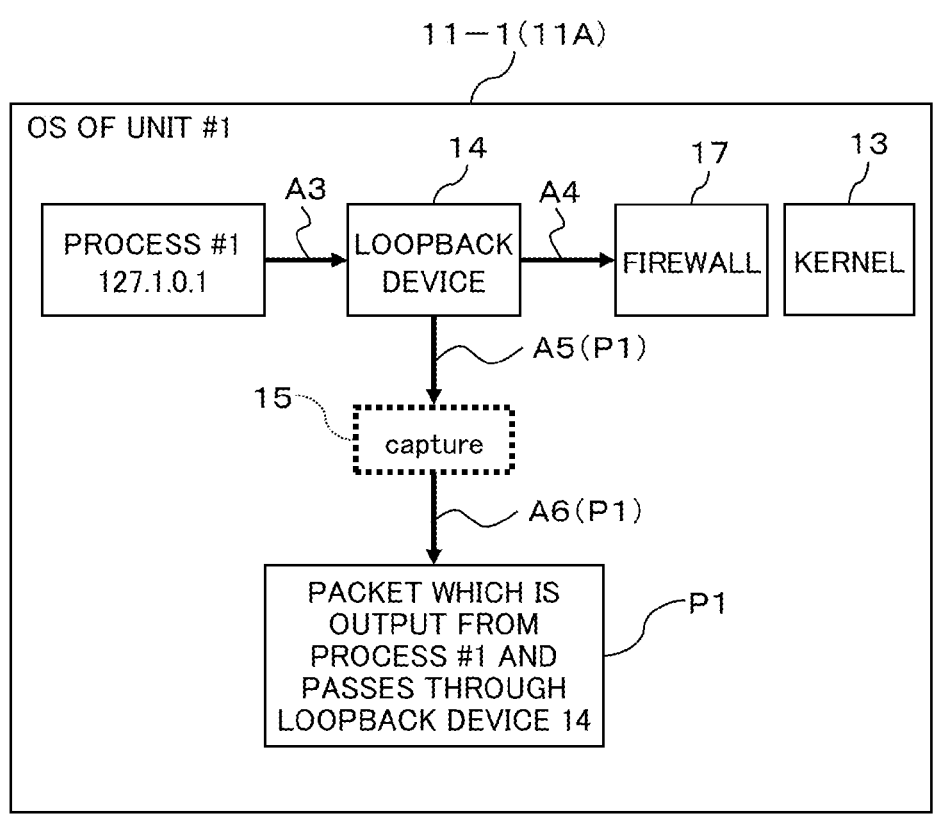

In order to suppress the situation which occurs in the unit 11-1 at the transmission source as described above, in the embodiment, the packet P1 which is addressed to the unit 11-2 at the transmission destination and has passed through the loopback device 14 is blocked and discarded by the blocking unit 17 before the packet is transferred to the kernel 13 (see arrow A4 of FIG. 10). Therefore, since the kernel 13 does not receive the packet P1, the reset signal is not replied from the kernel 13 to Process #1 at the transmission source, and thus it is possible to suppress that the communication between the units is ended without being established.

Further, in a case where an existing service (Process #2) is present in the unit 11-1 at the transmission source, the service (Process #2) in its own OS 11A replies instead of the service (Process #2) of the other unit 11-2. In other words, in a case where there is no special action, all the packets addressed to the units within a loopback address range are received in the unit 11-1 at the transmission source. For example, in FIG. 8, the packet P1 is transmitted to the unit at the address 127.1.0.2. However, since the address belongs to the loopback address range, the packet P1 comes to be received by the service in the OS 11A of the unit 11-1 which makes a reply. Even such a situation is solved since the firewall serving as the blocking unit 17 is set to discard the packet addressed to the unit at the address 127.1.0.2.

Figure 12:
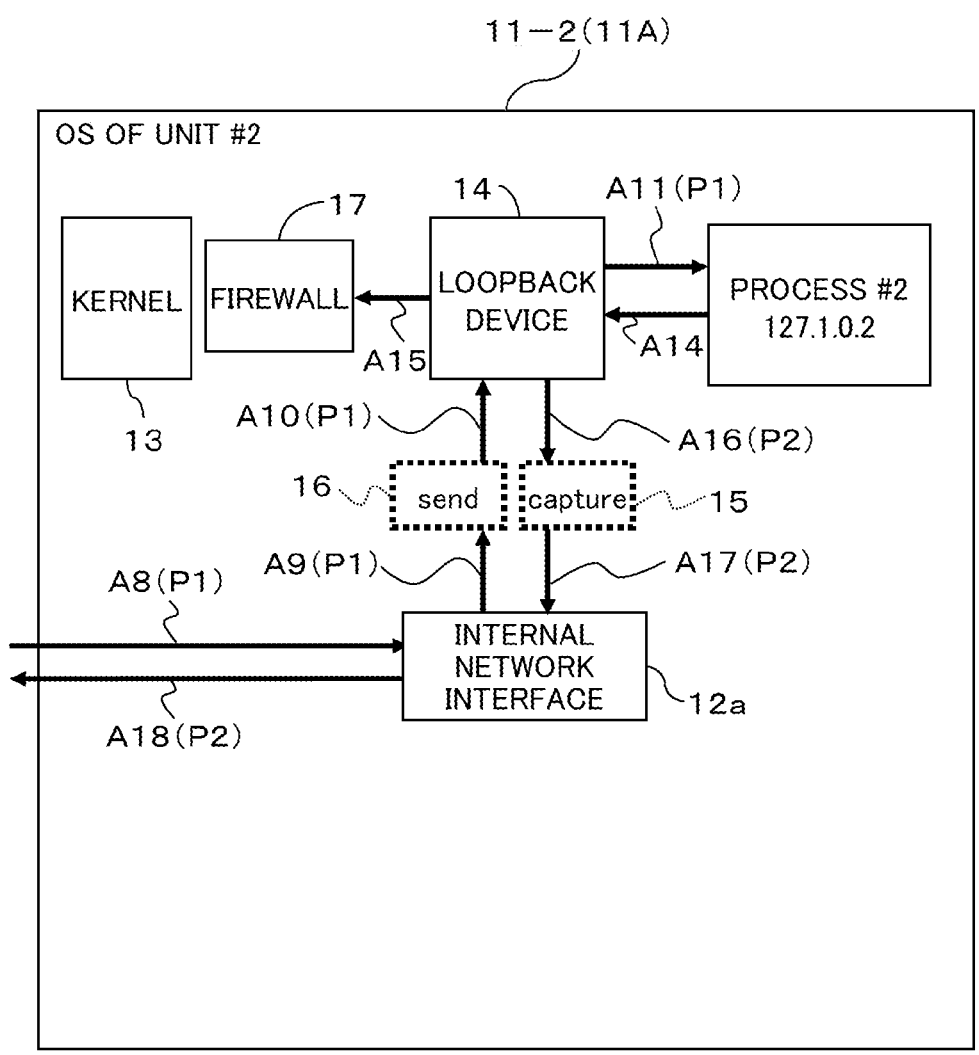
Figure 13:
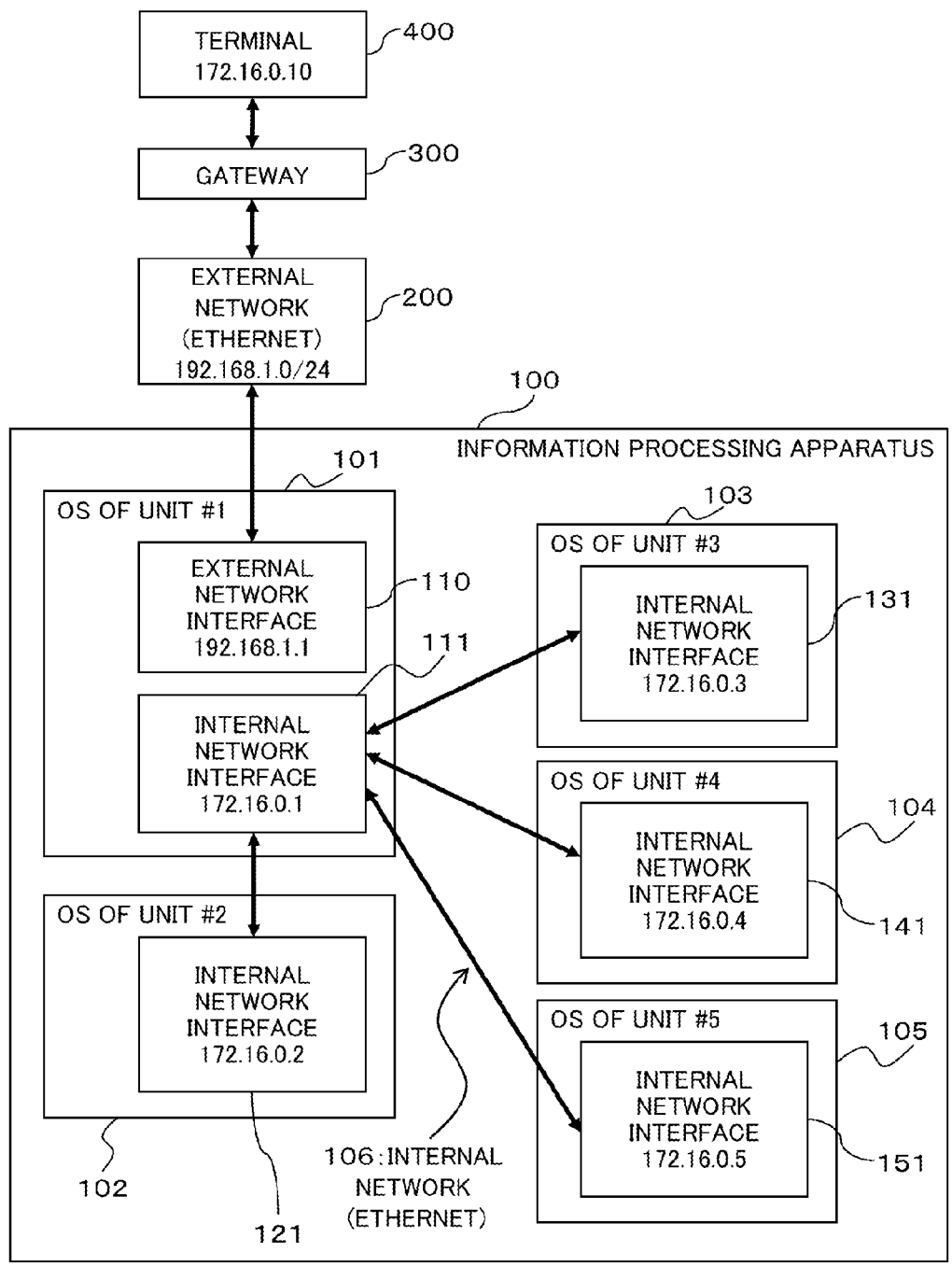
FIG. 13 is a diagram illustrating an example of a conflict between the address system of an internal network and the address system of an external network.

In addition, in FIGS. 9 and 10, the description has been made about the unit 11-1 at the transmission source, but as illustrated in FIGS. 11 and 12, even a disadvantage caused by the reset signal of the kernel 13 in the unit 11-2 at the transmission destination is solved using the function of the blocking unit 17. In other words, as illustrated in FIG. 11, Process #2 at the transmission destination which has received the packet P1 generates the response packet (reply packet) P2 to Process #1 at the transmission source and outputs the packet to the loopback device 14 (see arrow A14 of FIG. 11). The response packet P2 which passes through the loopback device 14 is extracted by the capturing unit 15 (see arrows A16 and A17 of FIG. 11). The extracted response packet P2 is output to an appropriate frame relay 12 by the function as the frame relay of the internal network interface 12a (see arrow A18 of FIG. 11). Therefore, the response packet P2 is transmitted to the unit 11-1 at the transmission source.

At this time, the response packet P2 which has passed through the loopback device 14 may be received by the kernel 13 (see arrow A15 of FIG. 11). When receiving the response packet P2, the kernel 13 considers the communication by the packet P2 as the TCP communication for a non-existent service (Process #1), and replies to Process #2 with the TCP reset signal (see arrows A19 and A20 of FIG. 11). By the reset signal, the connection of the TCP communication is cut off, and the communication relating to the response packet P2 from Process #2 is stopped. Therefore, even when there is a reply to the response packet P2 from the unit 11-1 at the transmission source, it is not possible to handle the reply, and thus the communication between the units is ended without being established.

In order to suppress the situation which occurs in the unit 11-2 at the transmission destination as described above, in the embodiment, the response packet P2 which is addressed to the unit 11-1 at the transmission source and has passed through the loopback device 14 is blocked and discarded by the blocking unit 17 before the packet is transferred to the kernel 13 (see arrow A4 of FIG. 10). Therefore, since the kernel 13 does not receive the response packet P2, the reset signal is not replied from the kernel 13 to Process #2, and thus it is possible to suppress that the communication between the units is ended without being established.

In addition, a port number at the transmission source is automatically assigned by the OS 11A. The application program itself may designate the port number at the transmission source, but it is an exception. Since the loopback address is present in every OS, the port number at the transmission source which is assigned by the OS of Unit #1 may be the same as the port number which is automatically assigned by the OS of Unit #2. However, in the embodiment, since the port number at the transmission source is managed for every IP address, the loopback address is assigned as an address exclusively for each unit 11 (for example, 127.1.0.2 is exclusively used for the OS of Unit #2). Therefore, it is restrained that the same port number at the transmission source is redundantly assigned.

[4] Advantages of Embodiment

According to the embodiment, using the loopback address, it is possible to establish the second address system, which is independent from the first address system of the external network 20, in the internal network 12 between the units 11 included in the information processing apparatus 10. Accordingly, the internal network 12 can be established without any influence on the external network 20.

Therefore, even when the setting of the external network 20 is changed, there is no need to change the setting of the internal network 12. Further, the internal network 12 can be established regardless of the setting of the external network 20.

Further, according to the embodiment, even in a case where an address for the internal network 12 is not possible to be secured, the address system of the internal network 12 can be established using the loopback address. The case where an address for the internal network 12 is not possible to be secured, for example, includes a case where all the private addresses are suppressed to make connection to a global space.

Furthermore, in a case where the unit 11-1 which is linked to the external network 20 is configured to include the NAPT mechanism 18, the respective units 11 in the information processing apparatus 10 can conduct communication with an external mechanism (for example, the terminal 40) which is connected to the external network 20.

Further, in the embodiment, when the communication is conducted between the units using the loopback address, the packet P1 and the response packet P2 which have passed through the loopback device 14 are blocked and discarded by the blocking unit 17 before being transferred to the kernel 13. Therefore, since the kernel 13 does not receive the packets P1 and P2, the reset signal is not replied from the kernel 13 to the process from which the packets P1 and P2 are issued. Accordingly, it is possible to suppress that the communication between the units is ended without being established.

Furthermore, the internal network interface 12a has a function of transferring the other packet except the packet addressed to its own unit to the other unit while selecting and transferring the packet addressed to its own unit to the sending unit 16. By the function, for example, in a case where the plurality of units 11 of each unified storage device described above are a plurality of virtual machines established on the hypervisor, it is possible to conduct communication between the units 11 which are directly connected to the other units 11 through the internal network 12.

[5] Others

Hitherto, the description has been made about preferred embodiments of the invention, but the invention is not limited to the related specific embodiments. The invention can be variously modified and changed within a scope not departing from the spirit of the invention.

Some or all of the functions as the internal network interface 12a, the capturing unit 15, the sending unit 16, the blocking unit 17, the converting unit 18, and the external network interface 20a described above may be realized by a predetermined program executed by a computer (including a micro-processing unit (MPU), a CPU, various types of terminals).

The program, for example, may be provided in types of being recorded in a computer-readable recording medium such as a flexible disk, a CD (a CD-ROM, a CD-R, a CD-RW, and the like), a DVD (a DVD-ROM, a DVD-RAM, a DVD-R, a DVD-RW, a DVD+R, a DVD+RW, and the like), and a Blu-ray disk. In this case, the computer reads the program from the recording medium, and transfers and stores the program into an inner storage unit or an external storage unit for use.

According to the embodiment, it is possible to establish the internal network which does not exert an influence on the external network.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus which is connectable to an external network, comprising:
    a plurality of units;
    an external network interface configured to be provided in at least one of the plurality of units and to be connected to the external network; and
    an internal network interface configured to be provided in each of the plurality of units and to be connected to an internal network which is established by a second address group different from a first address group of the external network connected to the external network interface,
    the internal network interface of each of the plurality of units conducts communication between the plurality of units using the second address group,
    each of the plurality of units includes a processor, an operating system (OS) and a loopback device which conducts inter-process communication in the OS,
    an address group in the inter-process communication conducted by the loopback device is used as the second address group,
    the internal network interface receives a packet addressed to its own unit from another unit according to the second address group, and
    the processor in a unit at a transmission destination among each of the plurality of units, to which the packet generated by a first process at a transmission source is transmitted, sends the packet, which is addressed to its own unit and received by the internal network interface, to a second process at the transmission destination through the loopback device, and captures a response packet, which is generated by the second process at the transmission destination and passes through the loopback device, to the first process at the transmission source.

2. The information processing apparatus according to claim 1, wherein the internal network is established by a general-purpose communication line which is not Internet Protocol (IP) communication or a shared memory between the plurality of units.

3. The information processing apparatus according to claim 1, wherein
    the processor captures a packet generated by the first process at the transmission source and passing through the loopback device, and
    the internal network interface outputs the packet captured to the internal network, and transmits the packet to the unit at the transmission destination according to the second address group.

4. The information processing apparatus according to claim 3, wherein the processor in each of the plurality of units blocks the packet, which passes through the loopback device, between the loopback device and a kernel of the OS.

5. The information processing apparatus according to claim 4, wherein in the unit at the transmission destination,
    the processor captures a response packet, which is generated by the second process at the transmission destination and passes through the loopback device, to the first process at the transmission source, and
    the internal network interface outputs the response packet captured to the internal network, and sends the response packet to the first process at the transmission source according to the second address group.

6. The information processing apparatus according to claim 5, wherein in the unit at the transmission destination, the processor blocks the response packet, which passes through the loopback device, between the loopback device and the kernel of the OS.

7. The information processing apparatus according to claim 3, wherein the processor in the at least one of the plurality of units connected to the external network performs address conversion between the first address group of the external network and the second address group of the internal network to conduct communication between a terminal and the plurality of units.

8. The information processing apparatus according to claim 1, wherein the internal network interface selects a packet addressed to its own unit and transfers the packet to the processor while transferring, to other unit, a packet other than the packet addressed to its own unit.

9. The information processing apparatus according to claim 1, wherein the plurality of units are a plurality of virtual machines, each of which is established on a hypervisor.

10. An information processing system comprising:
an external network; and
an information processing apparatus configured to be connectable to the external network and to be communicably connected to a terminal through the external network, wherein the information processing apparatus includes
an external network interface which is provided in at least one of the plurality of units and connected to the external network, and
an internal network interface which is provided in each of the plurality of units and connected to an internal network established by a second address group different from a first address group of the external network connected to the external network interface,
the internal network interface of each of the plurality of units conducts communication between the plurality of units using the second address group,
each of the plurality of units includes a processor, an operating system (OS) and a loopback device which conducts inter-process communication in the OS,
an address group in the inter-process communication conducted by the loopback device is used as the second address group,
the internal network interface receives a packet addressed to its own unit from another unit according to the second address group, and
the processor in a unit at a transmission destination among each of the plurality of units, to which the packet generated by a first process at a transmission source is transmitted, sends the packet, which is addressed to its own unit and received by the internal network interface, to a second process at the transmission destination through the loopback device, and captures a response packet, which is generated by the second process at the transmission destination and passes through the loopback device, to the first process at the transmission source.

11. The information processing system according to claim 10, wherein the internal network is established by a general-purpose communication line which is not Internet Protocol (IP) communication or a shared memory between the plurality of units.

12. The information processing system according to claim 10, wherein
the processor captures a packet generated by a first process at a transmission source and passing through the loopback device, and
the internal network interface outputs the packet captured to the internal network, and transmits the packet to a unit at a transmission destination according to the second address group.

13. The information processing system according to claim 12, wherein the processor in each of the plurality of units blocks the packet, which passes through the loopback device, between the loopback device and a kernel of the OS.

14. The information processing system according to claim 13, wherein in the unit at the transmission destination,
the processor captures a response packet, which is generated by the second process at the transmission destination and passes through the loopback device, to the first process at the transmission source, and
the internal network interface outputs the response packet captured to the internal network, and sends the response packet to the first process at the transmission source according to the second address group.

15. A non-transitory computer-readable recording medium having stored therein a program, the program is executed on an operating system (OS) installed in each of a plurality of units of an information processing apparatus,
the information processing apparatus includes the plurality of units and an internal network communicably connecting the plurality of units, at least one of the plurality of units is connected to an external network, and the program causes the OS to perform;
conducting communication between the plurality of units using a second address group of the internal network different from a first address group of the external network, the second address group being an address group in the inter-process communication conducted by a loopback device which is provided in the OS of each of the plurality of units and conducts inter-process communication in the OS, and
in a unit at a transmission destination among each of the plurality of units, to which a packet generated by a first process at a transmission source is transmitted, sending the packet to a second process at the transmission destination through the loopback device, the packet being addressed to its own unit from another unit and received by the internal network interface according to the second address group, and capturing a response packet, which is generated by the second process at the transmission destination and passes through the loopback device, to the first process at the transmission source.

* * * * *